United States Patent [19]

Fujishiro et al.

[11] Patent Number: 4,626,463
[45] Date of Patent: Dec. 2, 1986

[54] DISKETTE HAVING WEAR-RESISTANT MAGNETIZABLE LAYER

[75] Inventors: Chiaki Fujishiro, Hino; Mitsuhiro Kominami, Sagamihara, both of Japan

[73] Assignee: Minnesota Mining and Manufacturing Company, St. Paul, Minn.

[21] Appl. No.: 654,378

[22] Filed: Sep. 26, 1984

[51] Int. Cl.$^4$ .............................................. G11B 5/70
[52] U.S. Cl. ................................ 428/143; 252/62.54; 360/135; 427/128; 427/131; 428/148; 428/323; 428/328; 428/329; 428/694; 428/900; 428/695
[58] Field of Search .............. 428/694, 695, 421, 422, 428/900, 141, 143, 148, 323, 328, 329, 315.9, 317.9; 427/128, 131; 360/134–136; 252/62.54

[56] References Cited

U.S. PATENT DOCUMENTS

| | | | |
|---|---|---|---|
| 4,015,042 | 3/1977 | Chassaigne | 428/329 |
| 4,032,682 | 6/1977 | Masson | 428/694 |
| 4,163,823 | 8/1979 | Legras | 428/900 |
| 4,223,361 | 9/1980 | Zaitsu et al. | 360/133 |
| 4,396,674 | 8/1983 | Somezawa | 428/900 |
| 4,405,684 | 9/1983 | Blumentritt | 428/336 |
| 4,425,400 | 1/1984 | Yamaguchi et al. | 428/329 |
| 4,450,199 | 5/1984 | Tadokoro | 428/694 |
| 4,474,848 | 10/1984 | Yamaguchi | 428/695 |
| 4,546,035 | 10/1985 | Ko | 428/694 |
| 4,587,157 | 5/1986 | Brock | 428/216 |

FOREIGN PATENT DOCUMENTS 56-34993 3/1981 Japan .

*Primary Examiner*—Ellis P. Robinson
*Attorney, Agent, or Firm*—Donald M. Sell; James A. Smith; David K. Tellekson

[57] ABSTRACT

Magnetizable layer of a diskette, as in the prior art, comprises acicular magnetizable particles, alpha-$Fe_2O_3$ particles, and head-cleaning agent particles dispersed in nonmagnetizable binder. The magnetizable layer of the novel diskette differs from prior diskettes in that the alpha-$Fe_2O_3$ particles are acicular and comprise from 2 to 7 weight percent of said layer. Preferably the alpha-$Fe_2O_3$ particles together with the other particles comprise from 69 to 73 percent by weight of the magnetizable layer. This allows the layer to be desirably smooth and also sufficiently porous to absorb a topical lubricant in an amount of at least 2 percent by weight of the layer. A preferred topical lubricant is a mixture of a long-chain fatty acid such as oleic acid and an ester of a long-chain fatty acid such as hexadecyl stearate.

8 Claims, No Drawings

DISKETTE HAVING WEAR-RESISTANT MAGNETIZABLE LAYER

FIELD OF THE INVENTION

This invention concerns a magnetic recording medium of the type that is called the diskette which comprises a flexible magnetic recording disk contained in an envelope. A diskette is illustrated in U.S. Pat. No. 4,223,361 (Zaitsu et al.) which, like the present invention, concerns the need for better durability of the magnetizable layers of the disk.

BACKGROUND ART

U.S. Pat. No. 4,223,361 says that better wear resistance or durability is attained by combining two expedients of the prior art, namely, incorporating both granular (nonacicular) alpha-iron oxide particles and a liquid hydrocarbon lubricant in the magnetizable layers. The magnetizable layer of each of the examples comprises, based on 100 parts total weight, about 62 parts of acicular gamma-$Fe_2O_3$ particles, 1.5 parts of granular alpha-$Fe_2O_3$ particles, 6.5 parts carbon black, and 30 parts of binder. The gamma-$Fe_2O_3$ used in the examples is said to have a particle size of about 0.3 micrometer and an axis ratio of about 8, while the granular alpha-$Fe_2O_3$ has a particle size of about 1 micrometer. U.S. Pat. No. 4,223,361 says that the proportion of the magnetizable (gamma-$Fe_2O_3$) particles is usually desired to be from 50:50 to 90:10 by weight (col. 4, lines 4–7) and that the amount of the granular alpha-$Fe_2O_3$ particles is favorably from about 0.5 to 5% by weight of the magnetizable particles (col. 2, lines 28–30). The liquid lubricant is favorably used in an amount of about 0.5 part by weight or more to one part by weight of the alpha-$Fe_2O_3$ particles (col. 2, lines 55–58). The liquid lubricant is a topical lubricant in that it is coated from solution onto the magnetic recording layers and apparently is absorbed into pores, since the patent warns that an excessive amount would exude to the surface to contaminate the magnetic head.

Among other patents wherein alpha-$Fe_2O_3$ particles are included in a magnetizable layer is U.S. Pat. No. 4,425,400 (Yamaguchi et al.) which concerns video cassette recording tape and says nothing about diskettes. Even though the problems in the diskette art are very different from magnetic recording tape problems, it might be argued that U.S. Pat. No. 4,425,400 has teachings pertinent to the present invention because acicular alpha-$Fe_2O_3$ particles are used in the magnetizable layer. That layer also includes an abrasive (head-cleaning) agent such as fused alumina which is illustrated in the drawings as granular or nonacicular. The invention of U.S. Pat. No. 4,425,400 differs from prior art only by substituting acicular alpha-$Fe_2O_3$ for nonacicular alpha-$Fe_2O_3$. Doing so is said to decrease head abrasion, decrease jitter, increase tape durability, decrease contact noise, and decrease contamination in use. Based on 100 parts by weight total, a typical magnetic recording layer of U.S. Pat. No. 4,425,400 comprises 65 parts acicular gamma-$Fe_2O_3$ particles (long axis 0.9 micrometer, short axis 0.15 micrometer), 10 parts acicular alpha-$Fe_2O_3$ particles (preferably of smaller thickness than the gamma particles), 3 parts abrasive agent particles, 3 parts carbon black, and 19 parts of binder. The videotapes of U.S. Pat. No. 4,425,400 include lubricants such as the oleic acid and silicone oil used in the examples. The lubricants are incorporated into the dispersion that is coated out to provide a magnetic recording layer and hence are dispersed lubricants, as opposed to the topical lubricant of U.S. Pat. No. 4,223,361. U.S. Pat. No. 4,425,400 teaches that these dispersed lubricants are generally used in a proportion of about 0.2 to 20 parts per 100 parts by weight of binder (col. 4, lines 38–40).

Japanese patent application No. Showa 56-34993, filed Mar. 11, 1981, by Hitachi Maxell K. K. concerns a magnetic recording tape which is said to have improved wear resistance. Diskettes are not mentioned. The application includes a tape, the magnetizable layer of which comprises acicular gamma-$Fe_2O_3$ and alpha-$Fe_2O_3$ particles, carbon black, and dispersed lubricant.

One reason why diskettes and magnetic recording tapes involve different problems is that tape recorders invariably erase before re-recording, whereas all diskette recorders overwrite data without an intermittent erase. In order to completely eliminate each previous signal, the coercivity ($H_c$) of a diskette recording layer must be closely controlled. This involves close control of both the $H_c$ of individual magnetizable particles and of their proportion in the recording layer. For reliable overwrite in present-day standard diskette recorders, the magnetizable particles should provide a recording layer having an $H_c$ from 280 to 340 oersteds. In most diskettes now on the market, an $H_c$ within that range is provided by acicular gamma-$Fe_2O_3$ particles comprising from 60 to 65 percent by weight of a magnetizable layer.

Another problem unique to a diskette is that it is rotated at high speed while a recording head is pressed against the recording disk. Since the head may remain in moving contact with a single track of the recording disk for prolonged periods, the magnetizable layer must have excellent wear resistance. This requires a lubricant content that may be greater than can be tolerated in a dispersion from which a magnetizable layer is formed, because such a large quantity of dispersed lubricant might injure the integrity of the binder. For this reason, diskettes usually employ a topical lubricant (as in U.S. Pat. No. 4,223,361), often in combination with minor amounts of dispersed lubricant, whereas many audio and video tapes employ only dispersed lubricants (as in U.S. Pat. No. 4,425,400).

Diskette specifications require the recording layer to be exceedingly smooth, i.e., to have a smoothness better than 0.1 micrometer peak-to-valley. Upon applying a dispersion of acicular gamma-$Fe_2O_3$ particles in binder-forming material by techniques which will produce a usefully smooth coating, the resulting layer may have insufficient voids to absorb a desirably large amount of topical lubricant. As indicated in U.S. Pat. No. 4,223,361, any topical lubricant which is not absorbed by the magnetizable layer may contaminate the recording head.

DISCLOSURE OF THE INVENTION

The present invention concerns a diskette including a magnetic recording disk comprising a flexible backing and magnetizable layer which has extraordinarily good wear resistance without any sacrifice in other qualities such as reliable overwrite capability and good surface smoothness, i.e., better than 0.1 micrometer average peak-to-valley. The magnetizable layer of the novel diskette (like that of U.S. Pat. No. 4,223,361) comprises inorganic particles uniformly dispersed in a nonmagnetizable binder, which particles comprise acicular magnetizable particles, alpha-$Fe_2O_3$ particles, and head-cleaning agent particles having a Mohs hardness of at least 7 (a common diskette expedient although not mentioned in U.S. Pat. No. 4,223,361). Preferably the acicular magnetizable particles comprise from 60 to 65 percent by weight of the magnetizable layer. Also as in U.S. Pat. No. 4,223,361, the magnetizable layer includes topical liquid lubricant and may include electrically conductive carbon black particles.

The novel diskette differs from that of U.S. Pat. No. 4,223,361 in that (a) the head-cleaning agent particles comprise from 1 to 4 percent by weight of the layer, (b) the alpha-$Fe_2O_3$ particles are acicular, of approximately the same length and thickness as the magnetizable particles, and comprise from 2 to 7 weight percent of the layer, and (c) the topical lubricant is contained in pores of the layer in an amount of at least 2 percent by weight of the layer.

Preferably the acicular magnetizable particles, the head-cleaning agent particles, and the acicular alpha-$Fe_2O_3$ particles together comprise from 69 to 73 percent by weight of the magnetizable layer. As in U.S. Pat. No. 4,223,361, the acicular magnetizable particles may be gamma-$Fe_2O_3$. By employing them in an amount providing from 60 to 65 weight percent of the magnetizable layer, the novel diskette should have an $H_c$ of from 280 to 340 oersteds and thus have good overwrite capability in present-day standard diskette recorders. For present-day high-density diskette recorders, the acicular magnetizable particles may be cobalt-modified gamma-$Fe_2O_3$.

In the novel diskette, the acicular alpha-$Fe_2O_3$ particles function to create sufficient porosity to allow the topical liquid lubricant to comprise at least 2% by weight of each magnetizable layer. On the other hand, the lubricant preferably comprises less than 5% by weight of each magnetizable layer to avoid possible stiction problems. To achieve a porosity which will absorb from 2% to 5% by weight of topical lubricant while also attaining a desirably smooth surface plus overwrite capability, the acicular alpha-$Fe_2O_3$ particles plus the head-cleaning agent and acicular magnetizable particles together comprise from 69% to 73% by weight of the magnetizable layer. This not only affords sufficient porosity to enable the magnetizable layer to absorb at least 2% by weight of topical lubricant, but by doing so, the proportion of head-cleaning agent in the magnetizable layer can be at a high level that in prior tape constructions would have resulted in undue head wear. The higher proportion of head-cleaning agent affords greater durability to the magnetizable layer. For example, head-cleaning agents rarely comprise as much as 2% by weight of the magnetizable layers of prior diskettes, whereas they may comprise more than 2.5% by weight in the novel diskettes without producing undue head wear.

While the magnetizable layer preferably also contains electrically conductive carbon black particles, such particles in usual proportions have no substantial effect upon the porosity of the magnetizable layer and its ability to absorb topical liquid lubricant.

EXAMPLE 1

| Ingredient | Parts by weight | % by weight of layer |
| --- | --- | --- |
| Acicular gamma-$Fe_2O_3$ particles | 60.6 | 62.4 |
| Acicular alpha-$Fe_2O_3$ particles | 5.3 | 5.5 |
| Head-cleaning agent particles ($Al_2O_3$) | 2.6 | 2.7 |
| Electrically conductive carbon black ("Vulcan" XC-72) | 4.9 | |
| Lithium stearate dispersed lubricant | 0.16 | |
| Silicone dispersed lubricant | 0.03 | |
| lecithin | 3.0 | |
| Polyurethane elastomer ("Estane" 5703) | 9.6 | |
| Phenoxy resin (Union Carbide "PKHH") | 4.1 | |
| Solvent (2 parts methyl ethyl ketone and 1 part toluene) | 166.0 | |
| Oleic acid | 2.5 | |
| Activator 60% solids ("Mondur" CB-60) | 7.2 | |

The acicular gamma-$Fe_2O_3$ and alpha-$Fe_2O_3$ had respectively, average lengths of 0.6 and 0.8 micrometer and average aspect ratios of 7:1 and 10:1. The $Al_2O_3$ particles were approximately cubic or spherical with an average diameter of about 0.5 micrometer. The carbon black had an average particle size of about 0.03 micrometer. The polyurethane elastomer was understood to be a reaction product of poly(tetramethylene adipate)-glycol, 1,4-butanediol, and methylene diisocyanate. The phenoxy resin was a thermoplastic copolymer of equivalent amounts of bisphenol A and epichlorohydrin. The activator was understood to be a toluene diisocyanate adduct of trimethylolpropane.

A dispersion of the iron oxides, head-cleaning agent, and part of the wetting agent and solvent was formed in a ball mill. Then the carbon black, the balance of the wetting agent, a small portion of the binder, and additional solvent were added with continued milling until a smooth dispersion was obtained. At this point, the other ingredients (except the oleic acid and the activator) were added, and milling was continued until the dispersion again was smooth. The dispersion was transferred to a high-shear mixer. Immediately prior to coating, the oleic acid and activator were blended in by stirring, and the contents were immediately pumped into a coater to apply a uniform coating onto biaxially-oriented poly(ethylene terephthalate) polyester film having a thickness of 75 micrometers. The coating was dried in an oven to a thickness of about 2.5 micrometers. An identical coating was then applied to the opposite face of the polyester film, and both dried coatings were surface-treated to provide a magnetic recording medium having a magnetizable layer on each of its surfaces, each layer having a surface smoothness of about 0.04 micrometer average peak-to-valley. To each of the magnetizable layers was applied a 2% solution of a topical lubricant, followed by heating to evaporate the solvent. The face of each magnetizable layer was then examined, and if there was visual indication of any unabsorbed topical lubricant, the medium was discarded and a lower concentration of topical lubricant was employed to make a substitute recording medium. After weighing to determine the amount of lubricant that had been absorbed into each magnetizable layer, each medium was cut into disks, and each disk was converted for testing into a diskette called "Example 1 Diskette".

Testing

Topical lubricants used in testing the Example 1 Diskettes were
A. Perfluorinated polyether ("Krytox" AZ)
B. Butoxyethyl iso-stearate
C. A mixture of 3 parts of hexadecyl stearate and 1 part by weight of oleic acid.

A magnetizable layer of some of the Example 1 Diskettes (each 20.3 cm in diameter) was tested for durability at 4° C. in an accelerated-wear diskette tester (Toshiba ND 10S single-sided, modified drive) with the head in continuous contact along a single track at a radius of 8.75 cm. The face of each Example 1 Diskette was periodically examined visually for any disruption of the coating. If disruption was noted within four hours, the test was discontinued. Results:

| Lubricant | % by weight of layer | No. of diskettes tested | Failure |
|---|---|---|---|
| A | 5.6 | 5 | No |
| B | 2.3 | 5 | No |

A comparison test was run using a Prior Art Diskette which was identical to the Example 1 Diskette except having no acicular alpha-$Fe_2O_3$ particles and having only 1.8 parts by weight of the $Al_2O_3$ particles. The Prior Art Diskette would accept only 0.7% by weight of topical lubricant A, and when five Prior Art Diskettes containing lubricant A were tested in the Toshiba drive, their average failure was one hour.

A magnetizable layer of some of the Example 1 Diskettes was tested at room temperature in a commercial diskette drive (YD-180 of YE Data Corporation) with the head in continuous contact with a single track at a radius of 8.75 cm. Each diskette was periodically examined visually and was considered to fail upon any disruption of the coating. The testing was discontinued if the coating had not failed after $25 \times 10^6$ passes.

| Lubricant | % by weight of layer | No. of diskettes tested | Average No. of passes to failure |
|---|---|---|---|
| A | 5.6 | 10 | $10 \times 10^6$ |
| B | 2.3 | 10 | $13 \times 10^6$ |
| C | 2.3 | 10 | $>25 \times 10^6$ |

Ten Prior Art Diskettes wherein topical lubricant A comprised 0.7% by weight of the magnetizable layers experienced failure at $3.5 \times 10^6$ passes on the average.

The Example 1 Diskette containing Lubricant C was also tested at 53° C. There were no failures after $25 \times 10^6$ passes.

It is surprising that the topical lubricant C (which is a mixture of a long-chain fatty acid and an ester of long-chain fatty acid) should provide such great durability.

Another group of identical diskettes (except having a diameter of 13.3 cm) was tested at 4° C. in a commercial diskette drive (TEAC No. 55F) with the head in continuous contact with a single track at a radius of 5.3 cm. The testing was discontinued if there was no disruption of the coating after $7.2 \times 10^6$ passes.

| Lubricant | % by weight of layer | No. of diskettes tested | Average No. of passes to failure |
|---|---|---|---|
| A | 5.6 | 5 | $1.5 \times 10^6$ |
| B | 2.3 | 5 | $>7.2 \times 10^6$ |
| C | 2.3 | 5 | $5.0 \times 16^6$ |

Five Prior Art Diskettes wherein topical lubricant A comprised 0.7% by weight of the magnetizable layers failed on the average after $0.5 \times 10^6$ passes.

We claim:

1. Diskette including a magnetic recording disk which has reliable overwrite capability and has a flexible backing and a magnetizable layer of inorganic particles uniformly dispersed in a nonmagnetizable binder, which particles comprise acicular magnetizable particles, alpha-$Fe_2O_3$ particles, and head-cleaning agent particles having a Mohs hardness of at least 7, which layer has surface smoothness better than 0.1 micrometers peak-to-valley and topical liquid lubricant, characterized in that:
    (a) the head-cleaning agent particles comprise from 1 to 4 percent by weight of the layer,
    (b) the alpha-$Fe_2O_3$ particles are acicular, of approximately the same length and thickness as the magnetizable particles, and comprise from 2 to 7 weight percent of the layer, and
    (c) the topical lubricant is contained in pores of the layer in an amount of at least 2 percent by weight of the layer, and
    (d) the acicular magnetizable particles, the head-cleaning agent particles, and the alpha-$Fe_2O_3$ particles together comprise from 69 to 73 percent by weight of said layer.

2. Diskette including a magnetic recording disk as defined in claim 1 wherein the acicular magnetizable particles are gamma-$Fe_2O_3$.

3. Diskette including a magnetic recording disk as defined in claim 2 wherein the topical lubricant contained in pores of the magnetizable layer comprises from 2 to 5 percent by weight of the layer.

4. Diskette including a magnetic recording disk as defined in claim 3 wherein the topical lubricant is a mixture of long-chain fatty acid and an ester of long-chain fatty acid.

5. Diskette including a magnetic recording disk as defined in claim 4 wherein the topical lubricant is a mixture of 3 parts of hexadecyl stearate and 1 part by weight of oleic acid.

6. Method of making a magnetic recording disk for a diskette comprising the steps of (1) dispersing into binder-forming material acicular magnetizable particles, alpha-$Fe_2O_3$ particles, and head-cleaning agent particles having a Mohs hardness of at least 7, (2) coating the dispersion onto a flexible backing to provide a sheet having a magnetizable layer, (3) impregnating the magnetizable layer with liquid topical lubricant, and (4) cutting the sheet into magnetic recording disks, characterized in that
    (a) the head-cleaning agent particles comprise from 1 to 4 percent by weight of the layer,
    (b) the alpha-$Fe_2O_3$ particles are acicular, of approximately the same length and thickness as the magnetizable particles, and comprise from 2 to 7 weight percent of the layer, and (c) the liquid topical lubricant is contained in pores of the layer in an amount of at least 2 percent by weight of the layer, and
(d) the acicular magnetizable particles, the head-cleaning agent particles, and the alpha-$Fe_2O_3$ particles together comprise from 69 to 73 percent by weight of said layer.

7. Method as defined in claim 6 wherein the topical lubricant is a mixture of long-chain fatty acid and an ester of long-chain fatty acid.

8. Method as defined in claim 7 wherein the topical lubricant is a mixture of 3 parts of hexadecyl stearate and 1 part by weight of oleic acid.

* * * * *